United States Patent Office 3,649,661
Patented Mar. 14, 1972

3,649,661
COORDINATED COMPLEXES OF NITROGENOUS COMPOUNDS
Ferdinand P. Otto, Woodbury, and Andreas Logothetis, Haddonfield, N.J., assignors to Mobil Oil Corporation
No Drawing. Continuation-in-part of application Ser. No. 585,253, Oct. 18, 1966. This application Mar. 24, 1970, Ser. No. 22,399
Int. Cl. C07f 3/06, 7/22, 15/04
U.S. Cl. 260—429.7   14 Claims

ABSTRACT OF THE DISCLOSURE

Metal complexes having improved detergency and neutralizing characteristics for industrial fluids are produced by reacting a nitrogen-containing compound with a metal salt and an alkenylsuccinic acid or anhydride. The latter two components may be reacted separately with the nitrogen in either of two possible orders, or the metal complex can be formed in situ by mixing all reactants at the same time.

CROSS REFERENCE TO RELATED APPLICATIONS

This application is a continuation-in-part of copending U.S. application Ser. No. 585,253, filed Oct. 10, 1966, now abandoned.

BACKGROUND OF THE INVENTION

Field of the invention

This invention relates to stabilized organic compositions containing novel additives and in particular this invention relates to organic compositions containing metal complexes.

Discussion of the prior art

It is known that in the normal use of organic industrial fluids, such as lubricating oils, transmission fluids, bearing lubricants, power transmitting fluids and the like, the base medium is subjected to oxidizing conditions which may result in the formation of sludge, lacquers, corrosive acids, and the like. These products are undesirable in the equipment in which the industrial fluid is used. The oxidation residues or heavy contaminants may interfere with the normal operation of the fluid, increase its viscosity, and even cause severe damage to the parts of the equipment themselves.

In the lubrication of modern engines, particularly, oil compositions must be able to prevent acids, sludge and other solid contaminants from remaining near the moving metal parts. Poor piston travel and excessive engine bearing corrosion may result, unless the oil can prevent the sludge and oxidation products from depositing in the engine. Bearing corrosion is another serious problem in gasoline engines which operate at an oil temperature of about 300° F. or higher.

The most desirable way of decreasing these difficulties is to add to the base organic fluid a detergent or dispersant additive capable of dispersing the solid particles to prevent them from interfering with the normal operation of the equipment, and leaving the metal surfaces relatively clean. Today, with modern equipment operating under increasingly strenuous conditions, it is desirable to develop new detergents which have improved dispersant properties, which are soluble in the fluid medium to which they are added, and which are themselves stable therein.

SUMMARY OF THE INVENTION

The invention provides a coordinated metal complex prepared by reacting an organic nitrogen compound of the formula $$H_2N(RNH)_zH$$

wherein R is alkylene containing from 2 to 5 carbon atoms and z is from 1 to about 10, with (1) An alkenylsuccinic acid or anhydride wherein the alkenyl is derived from a hydrocarbon containing from 8 to about 300 carbon atoms, and (2) A metal salt which is the product of a metal selected from the group consisting of Groups I-B, II-B, IV-A, VI-B and VIII of the Periodic Table and an acid selected from the group consisting of an organosulfonic acid having from 1 to about 50 carbon atoms, an organophosphorus acid having from 1 to about 300 carbon atoms, sulfamic acid, and a polyolefinic succinamic acid. It will be understood that the above elements (1) and (2) may be reacted in either order with the organic nitrogen compound, or all three reactants may be reacted together at the same time.

The invention further provides organic fluid compositions comprising a major proportion of an organic fluid and a minor amount of the coordinated metal complex product. When used in accordance with this invention, the metal complexes may be present in the organic fluid to the extent of from about 0.05 to about 25% by weight thereof.

DESCRIPTION OF THE SPECIFIC EMBODIMENTS

The preferred metal-containing reagents may be prepared as metal salts of the following acids:

(1) sulfonic acids, HR—SO₃
(2) phosphoric acids, HR₂PO₄ or H₂RPO₄
(3) phosphinic or phosphonic acids,

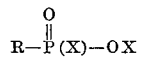

[X may be R, hydrogen, or hydroxy], and
(4) sulfamic acid, HO—SO₂—NH₂ wherein R is an alkyl, aryl, aralkyl or alkaryl radical having from 1 to about 50 carbon atoms; and oxygen-, sulfur-, and nitrogen-containing derivatives thereof. Although acid (4) is inorganic, nevertheless it shares with the other acids the ability to form the stable and useful metal complexes of this invention.

Broadly, the organic nitrogen compound reactants of this invention contain "basic nitrogen atoms" such as those found in amine compounds. The said nitrogen compounds preferably have an ionization constant greater than $10^{-12}$.

The preferred basic nitrogen compounds include an alkenylsuccinimide compound having up to about 4000 carbon atoms in the alkenyl portion.

The reaction between the amine compound, either per se or reacted with an alkenylsuccinic acid or anhydride, and the metal salt is conducted at a temperature ranging from about 60° to about 250° C. under atmospheric or reduced pressure conditions. Generally the mole ratio is from about 0.5 to about 2 moles of metal reagent per mole of nitrogen compound.

As indicated previously, the preferred metal-containing coordination complex reagent may be a metal salt of organo-sulfonic acids, organic phosphorus-containing acids, polyolefinic succinamic acid or sulfamic acids. The organic portion of the first two groups is ordinarily a hydrocarbyl substituent having from 1 to 50 carbon atoms, and more preferably from 1 to 30 carbon atoms. The polyvalent metal salts of these acids, especially the divalent metals, provide suitable reagents for the porducts of this invention. The metal is preferably selected from Groups I-B, II-B, IV-A, VI-B, and VIII of the Periodic Table;

the acceptable metals include zinc, tin, nickel, copper, cobalt, cadmium, chromium and lead. Of these the most preferred are zinc, tin and nickel.

The organophosphorus salts include metal salts of alkyl, aryl, and alkaryl phosphoric acids, such as butyl phosphate, octyl phosphate, phenyl phosphate, methylphenyl phosphate, diamylphenyl phosphate, phosphosulfurized olefins and polyolefins, where the olefins and polyolefins have from 1 to about 300 carbon atoms, and the like, as well as the corresponding phosphonates and phosphinates. Organic phosphorus compounds containing two or more phosphorus atoms may also be used. Of the organo sulfonates which may be used are such sulfonates as those derived from mineral oils, such aryl sulfonates as phenylsulfonate, naphthylsulfonate, tolylsulfonat, wax-benzene sulfonate, including mono- and multi-alkyl-substituted derivatvies of any of these aryl sulfonates and the like. The preparation of these organic phosphorus compounds and sulfonates is well known in the art.

One form of the nitrgoen compound is the alkenyl-succinic derivatives of polyamines, wherein the alkenyl group is a hydrocarbon containing from 8 to about 300 carbon atoms and preferably from 40 to 200. These derivatives are produced by reacting an alkenylsuccinic acid or anhydride, produced by known techniques from an olefin or polyolefin and maleic anhydride, with a polyamine in sufficient molar proportion to form a succinimide, or the amide, diamide or amine salts or mixtures thereof containing residual basic nitrogen atoms. In preparing the imide, the mole ratios may range from about 0.5 to about $x$-1 moles of succinic acid or anhydride per mole of polyamine, wherein $x$ is the number of nitrogen atoms in the polyamine. The olefin may be a simple alkene, such as 1-octene, 1-decene, 1-dodecene, and so forth, or it may be a polymer of such olefins as ethene, propene 1-butene, isobutene, 1-hexene, 1-octene and so forth.

The polyamine reactantsuitilizable herein are principally alkylene polyamines of the structure $H_2H(R'NH)_zH$, $R'$ being a 2- to 5-carbon alkylene group, and $z$ is 1 to 10. The alkylene polyamines include the ethylene, propylene, butylene and pentylene amines, as well as the polymethylene amines exemplified by ethylene diamine, triethylene tetramine, propylene diamine, butylene diamine, amylene diamine, tetraethylene pentamine, di(methylethylene) triamine, hexapropylene heptamine, decaethylene undecamine, tripropylene tetramine, triamylene tetramine, and the like. Also included are the piperazines, e.g., piperazine itself as well as aminoalkyl-substituted piperazines.

As stated heretofore, the alkenylsuccinic anhydride or acid is reacted with the polyamine compound in a mole ratio which will permit the resulting product to retain one or more basic nitrogen atoms. For example, reacting 2 moles of the alkenylsuccinic anhydride with 1 mole of an ethylene polyamine having more than 3 nitrogen atoms in the molecule may produce a bisimido compound having at least 1 basic nitrogen atom remaining in the molecule. The structure of this product may be:

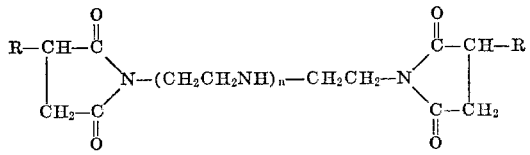

wherein R is the alkenyl group above-defined and $n$ may range from 1 to about 6.

Additional succinyl groups may be present on the moleculed depending upon the mole ratio of anhydride to polyamine. It is believed that the relation product of these succinic anyhdride-polyamine reactions may be actually a mixture of compounds of which the above-described structures are the major or effective components. For this reason, these basic nitrogen-containing products are preferably described by the manner in which they are prepared.

In the above structure, the cyclic succinimide group

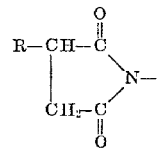

may be opened by reaction in the presence of a metal compound to form the metal salt of the monoamide derivative to give

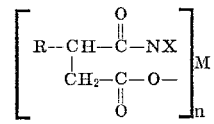

wherein M is the metal, X is the remainder of the succinimide molecule, and $n$ is the valence of the meal. This metal salt of succinamic acid may also be used as a metal-complexing reagent.

These basic nitrogen compounds are reacted with the metal salt to yield what is believed to be a complex of the metal salt and the basic organic compound. A salt-forming reaction does not occur since there is no evidence of the anion of the metal salt producing a separate by-product. Moreover, the resulting reaction mixture upon analysis appears to be a single molecule; similar to those existing in the coordinated complexes of the Werner-type. For the purpose of this invention, therefore, the product compounds are referred to herein as coordinated complexes.

As is apparent from the discussion thus far, an amine, including a polyamine, may be first reacted with the metal complexing reagent to produce a metallo-amine, complex intermediate. Then this intermediate is reacted with the alkenylsuccinic acid or anhydride to produce the final oil-soluble metal complex product of this invention. Since the metal-complexing reaction is quite rapid even at room temperature, and also since the oxides, hydroxides and carbonates do not form complexes with the nitrogen-containing compounds, all three reactants may be added together to produce an in situ product, by first mixing the reactants and then heating to form the succinimide.

The base fluids for which the compounds of this invention find utility include gasoline, petroleum products of both lubricating and fuel viscosities, and synthetic fluids. In the latter class may be included synthetic ester lubricants, such as those from monohydric alcohols and dicarboxylic acids, glycol or glycerols with monocarboxylic acids, and pentaerythritols with carboxylic acids, including alcohols having from 4 to about 20 carbon atoms, and carboxylic acids having from 2 to about 18 carbon atoms. Many synthetic esters may have mixed alcohols or carboxylic acids. Commonly may be included 2 - ethylhexyl sebacate, trimethylolpropane trioctanoate, and especially pentaerythritol esters of valeric acid, isovaleric acid, caproic acid, caprylic acid, pelargonic acid, capric acid, and the like. Of special interest is a mixed pentaerythritol ester of an equimolar proportion of commercial valeric acid (containing isovaleric acid) and pelargonic acid. Other synthetic fluids include liquid polyolefins, alkylene oxide fluids, silicone fluids, polyacetals, and simple hydrocarbons of stable fluid viscosities.

In one aspect of this invention, it has been discovered that lubricant compositions containing these complexes possess greater thermal stability, and result in more effective dispersancy in high-output-high-temperature engines than with uncomplexed nitrogen compounds, and yet the compositions retain excellent low temperature detergent qualities.

The following examples illustrate this invention more clearly. All parts and percentages are on a weight basis unless otherwise specified.

EXAMPLE 1

Alkyl ($C_{15}$–$C_{20}$) benzene sulfonate (5120 parts) was placed in a reaction vessel and was degassed at room temperature by purging with nitrogen for 2 hours. 600 parts of water and 300 parts of zinc oxide were added to in one hour at about 50° C. The reaction temperature was raised to 100° C. in about 1 hour while bubbling nitrogen in, during which time water was entrained and removed. 1540 parts of Promar #5 process oil was added and stripping of water was continued until a temperature of 150° C. was reached (2½ hours). Final stripping of water was accomplished at 150° C. under a vacuum of 9 mm. of Hg. The product, filtered through Hyflo clay, had the following analyses:

|  | Percent | |
|---|---|---|
|  | Calculated | Found |
| Zinc | 3.60 | 3.58 |
| Sulfur | 3.50 | 3.22 |

The alkylbenzene is a mixture of 60% monoalkylbenzene and 40% dialkylbenzene derived from a mixture of $C_{15}$–$C_{20}$ olefins.

Promar #5 process oil is a refinery process oil produced by the furfural extraction of a high paraffin feed stream. It has low aromatic and naphthenic contents and a very low percentage of sulfur. Its viscosity is such that the oil is suitable as a solvent in certain commercial operations.

EXAMPLE 2

The zinc alkylbenzene sulfonate of Example 1 (20.6 parts), 2.4 parts of tetraethylenepentamine and 10.0 parts of Promar #5 process oil were placed in a suitable reaction vessel and reacted at 150° C. for 2 hours. 47.52 parts of polybutenylsuccinic anhydride (made from maleic anhydride and polybutene having a molecular weight of 1350) was added in about 30 minutes, followed by slowly applying vacuum to the vessel. The reaction was continued for 2½ hours at 150° C. at a vacuum of 15–25 mm. of Hg. The product was a clear, dark brown, viscous oil having 0.99% N (calculated 1.0%), 0.94% Zn (calculated 0.91%) and 1.03% S (calculated 0.90%). It had a Total Base Number of 18.0 mg. KOH/gm., a Total Acid Number of 20.7 mg. KOH/gm. and a KV at 210° F. of 551.

EXAMPLE 3

A mixture of polypropylphenyl phosphates was prepared by charging 2600 parts of polypropylphenol (from polypropylene having a molecular weight of 825 and phenol) to a reaction vessel and adding thereto, over a period of 2 hours at 100° C., 94 parts of $P_2O_5$. Following addition of the $P_2O_5$, the reaction was completed by heating at 130° C. for 4 hours. The product had 1.45% P (calculated 1.50%) and a Total Acid Number of 35.4 mg. KOH/gm.

EXAMPLE 4

The polypropylphenyl phosphate of Example 3 (2500 parts) and 867 parts of Promar #5 process oil were placed in a reactor and heated to 80° C. 110 parts of zinc carbonate was added slowly over about ¾ hour, and the reaction mixture was heated for 3 hours at 150° C. while bubbling in nitrogen to remove water. Thereafter, the mixture was heated at 150° C. for 2 hours at 5–10 mm. of Hg, and then was filtered through a preheated Buchner funnel. The product had 1.30% Zn (calculated 1.50%) and 1.00% P (calculated 1.00%).

EXAMPLE 5

1320 parts of the product of Example 4, 57 parts of tetraethylenepentamine and 382.8 parts of Promar #5 process oil were placed in a reactor and heated for 2 hours at 150° C. To this product was added 1092 parts of polybutenyl-succinic anhydride (from maleic anhydride and polybutene having a molecular weight of 1350) in 15 minutes and the mixture was reacted for one hour at 150° C. while passing through nitrogen to remove water. Finally, the product was heated at 150° C. for 3 hours under a vacuum of 5 mm. of Hg. The complex was a dark brown, clear, viscous liquid having the following analyses:

|  | Percent | |
|---|---|---|
|  | Calculated | Found |
| Nitrogen | 0.68 | 0.62 |
| Zinc | 0.59 | 0.59 |
| Phosphorus | 0.46 | 0.46 |

EXAMPLE 6

1820.4 parts of nonylphenol was placed in a reactor and 387.6 parts of $P_2O_5$ was added thereto at 100° C. over a period of 4 hours. The mixture was heated a further 4½ hours at 130° C., and was then filtered to give a product having the following analyses:

|  | Calculated | Found |
|---|---|---|
| Phosphorus, percent | 7.95 | 7.98 |
| Total acid No | 191 mg. KOH/gm. | |

EXAMPLE 7

The zinc salt of the product of Example 6 was prepared by mixing 800 parts of such product with 485 parts of Promar #5 process oil and adding thereto 190 parts of zinc carbonate in ¾ hour at 80–90° C. and heating this mixture for a further 3 hours at 145° C. and then for 1½ hours at 130° C. at 180 mm. of Hg. The filtered product contained 5.98% Zn (calculated 5.50%) and 4.26% P (calculated 4.30%).

EXAMPLE 8

Five hundred parts of the zinc nonylphenyl phosphate of Example 7, 95 parts of tetraethylenepentamine and 470 parts of Promar #5 process oil were placed in a reactor and heated for two hours at 150° C. To this product was added 1820 parts of polybutenylsuccinic anhydride (see Example 5 for the definition of this reactant). The reaction mixture was heated for 3 hours at 150° C. under 5 mm. of Hg vacuum. The complex was a dark brown, clear, viscous liquid having the following analyses:

|  | Percent | |
|---|---|---|
|  | Calculated | Found |
| Nitrogen | 1.14 | 1.11 |
| Zinc | 1.05 | 1.31 |
| Phosphorus | 0.70 | 0.76 |

EXAMPLE 9

The nickel salt of alkyl ($C_{15}$–$C_{20}$) benzene sulfonate was prepared by adding 81.5 parts of nickel carbonate ($NiCO_3$) in ½ hour at 50° C. to a mixture of 1000 parts of the sulfonate, 100 parts of water and 240 parts of Promar #5 process oil, heating this mixture for a further one hour at 100° C. while passing in nitrogen, and then heating under a vacuum of 20 mm. of Hg for 3 hours at 150° C. The filtered product contained 2.30% Ni and 3.60% S.

EXAMPLE 10

Nine hundred seventy eight parts of the Example 9 product, 95 parts of tetraethylenepentamine and 322 parts of Promar #5 process oil were placed in a reactor and reacted for 2½ hours at 150° C. To this product was added 1850 parts of polybutenylsuccinic anhydride (see Example 5) in about ½ hour, and this mixture was heated for 2½ hours under a vacuum of 4 mm. of Hg while passing in nitrogen. The complex thus formed was a clear, dark brown, viscous liquid containing:

|  | Percent | |
| --- | --- | --- |
|  | Calculated | Found |
| Nitrogen | 1.07 | 0.97 |
| Nickel | 0.85 | 0.84 |
| Sulfur | 0.80 | 0.87 |

EVALUATION OF PRODUCTS

The metal coordinated complex products of this invention have been tested in a series of tests designated to indicate the utility of these products in lubricating oils and fuels.

(1) THE SULFURIC ACID NEUTRALIZATION TEST

This test measures the ability of an oil additive to neutralize strong acids formed in the engine operating on sulfur containing fuels. Sulfuric acid is mixed with a heated blend of the additive and the oil in iso-octane. The solution is centrifuged to separate out insoluble material. The optical density of the clear solution is measured. From this value, the optical density of a blend of the additive applied to a corresponding amount with iso-octane is subtracted; the difference gives the optical density of dispersed sulfuric reaction products. The optical density of an acetone extraction of the iso-octane-oil solution is then determined. The average optical density of the iso-octane-oil solution is expressed as the optical density of the dispersed sulfuric acid reaction product. The average optical density of the acetone solution is expressed as the optical density of the non-dispersed sulfuric reaction products. The total of these values or either one alone is used in the evaluation of detergent additives. The lower the value of this test, the better the detergent.

(2) PYRUVIC ACID DISPERSION TEST

This test measures the dispersant value of an oil additive and indicates the detergent properties when used in lubricating engines operating on low sulfur compound fuels. The values of this test are taken with those of the sulfuric acid test to predict the performance of these additives. Pyruvic acid is mixed with a heated blend of the additive and oil. The mixture is diluted with benzene and centrifuged to separate the insoluble materials. The insolubles are dissolved in acetone. The optical density of the oil-benzene solution gives the total amount of color. From this value, the optical density of the initial additive blend diluted with benzene to a corresponding amount is subtracted. This corrected value is expressed as the optical density of the dispersed pyruvic acid polymer. The optical density of the acetone solution is expressed as the optical density of the non-dispersed pyruvic acid polymer. The higher the percentage of the pyruvic acid results, the better the additive.

The blends of oil tested in these two tests are produced from a solvent refined lubricating oil of S.A.E. 30 grade containing 3% active ingredient of the additive and 1% of zinc dihexylphosphorodithioate. Each blend was tested in the two tests. The results are shown in Table I below:

TABLE I

| Additive | Pyruvic acid test | Sulfuric acid test |
| --- | --- | --- |
| None | 58.6 | 0.102 |
| Example 2 | 99.2 | 0.003 |
| Example 5 | 99.5 | 0.003 |
| Example 8 | 99.5 | 0.005 |
| Example 10 | 99.8 | 0.002 |

1-H CATERPILLAR ENGINE TEST

The test is performed to evaluate detergency characteristics of a sample oil by rating the quantity of sludge and lacquer deposits in a single cylinder diesel engine operating up to 480 hours. The engine is operated under a steady load and is stopped periodically for oil changes. The fuel used contains 70% of a coastal gas oil, 20% of a Kuwait 650° F. gas oil and 10% of kerosene. The lubricating oil is a straight grade solvent S.A.E. 30 refined oil containing 3.3% of an overbased calcium sulfonate 1.6% of a barium salt of phosphosulfurized polybutene and 1.14% of zinc o-isopropyl-o-ethylhexyl phosphorodithioate.

The engine is operated under the following conditions:

Speed, r.p.m. ---------------------------- 1800±10
Intake air temp., ° F. -------------------- 170±5
Coolant out temp., ° F. ------------------ 160±5
Oil pressure, p.s.i. ---------------------- 30±1

At the end of the test, the engine is dismantled and various parts thereof, such as the pistons and rings, are inspected for dirt, sludge and lacquer deposits. The following results using 2.1% by weight of the additive were obtained.

TABLE II

| Additive | Hours | Piston | Lacquer demerits | Top groove packing, percent |
| --- | --- | --- | --- | --- |
| Example 2 | 120 | 99.1 | 0.5 | 1 |
|  | 240 | 93.6 | 4.6 | 2 |
| Example 5 | 120 | 99.8 | 0.0 | 1 |
|  | 240 | 99.4 | 0.1 | 2 |
|  | 480 | 97.1 | 1.4 | 8 |
| Example 8 | 120 | 98.6 | 0.9 | 1 |
|  | 240 | 95.5 | 3.2 | 1 |
|  | 480 |  |  |  |
| Example 10 | 120 | 98.8 | 0.9 | 0 |
|  | 240 | 97.0 | 1.8 | <1 |

It is further contemplated that these additives will be useful in fuels in preventing deposits.

As is well known, fuel oils, particularly distillate fuel oils, such as those used as domestic heating oils and diesel fuels, have a tendency to deteriorate in storage and to form sludge. Also, by the time the fuel oil reaches the consumer, it contains small amounts of foreign substances, such as condensed moisture and particles of rust and dirt, which become entrained in the oil from the tanks and pipes of the fuel distribution system. A serious problem encountered with fuel oils arises from their tendency to deposit the formed sludge and foreign bodies on the screens, filters, nozzles, etc., of burners and engines using them. These deposits cause clogging of these elements which in turn necessitates cleaning and repairs. It has been found that this clogging problem can be substantially alleviated by the addition to the fuel oil of minor amounts of chemical additives known as anti-clogging agents, which have the ability to prevent these deposits. The products of the present invention will exhibit excellent anti-clogging action when added to fuel oils.

ANTISCREEN CLOGGING TEST

The test procedure involves pumping a fuel oil contaminated with 15 grams per 4 liters of a synthetic sludge, composed of 10% carbon, 40% water and 50% fuel oil, through a conventional oil burner screen for two hours. The amount of deposits on the screen at the end of the test is rated on a scale of from 100 to 0, a rating of 100 indicating a perfectly clean screen and a rating of zero representing the sludge deposited by the base fuel containing no additive. The base fuel oil used in the tests comprises 60% catalytically cracked component and 40% straight-run component and has a boiling range of approximately 320° to 640° F. The results of this test are presented below:

| Product added | Amount added, lbs./ 1,000 bbl. | Results |
| --- | --- | --- |
| None | 0 | 0 |
| Example 5 | 25 | 95 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

We claim:
1. A coordinated metal complex product prepared by reacting an organic nitrogen compound of the formula

$$H_2N(RNH)_zH$$

wherein R is an alkylene containing from 2 to 5 carbon atoms and z is from 1 to about 10, with
(1) an alkenylsuccinic acid or anhydride wherein the alkenyl is derived from a hydrocarbon containing from 8 to about 300 carbon atoms, and
(2) a metal salt which is the product of reaction between a metal selected from the Group consisting of Groups I–B, II–B, IV–A, VI–B and VIII of the Periodic Table and an acid selected from the group consisting of an organosulfonic acid having from 1 to about 50 carbon atoms, an organophosphorus acid selected from the group consisting of organophosphoric acid, organophosphinic acid and organophosphonic acid, each having from 1 to about 300 carbon atoms, sulfamic acid and a polyolefinic succinamic acid.

2. The product of claim 1 wherein (1) is first reacted with the organic nitrogen compound.
3. The product of claim 1 wherein (2) is first reacted with the organic nitrogen compound.
4. The product of claim 1 wherein the metal is selected from the group consisting of zinc, tin and nickel.
5. The product of claim 1 wherein the organic nitrogen compound is tetraethylenepentamine.
6. The product of claim 1 wherein the alkenylsuccinic compound is polybutenylsuccinic anhydride.
7. The product of claim 1 wherein the metal salt is zinc alkylbenzene sulfonate.
8. The product of claim 1 wherein the metal salt is zinc polypropylphenyl phosphate.
9. The product of claim 1 wherein the metal salt is zinc nonylphenyl phosphate.

10. The product of claim 1 wherein the metal salt is nickel alkylbenzene sulfonate.
11. The product of claim 1 wherein the organic nitrogen compound is tetraethylenepentamine, the alkenylsuccinic compound is polybutenylsuccinic anhydride and the metal salt is zinc polypropylphenyl phosphate, wherein said polybutenyl and said polypropyl are respectively derived from polybutene having a molecular weight of 1350 and polypropylene having a molecular weight of 825.
12. The product of claim 1 wherein the organic nitrogen compound is tetraethylenepentamine, the alkenylsuccinic compound is polybutenylsuccinic anhydride and the metal salt is zinc nonyphenyl phosphate, wherein said polybutenyl is derived from polybutene having a molecular weight of 1350.
13. The product of claim 1 wherein the organic nitrogen compound is tetraethylenepentamine, the alkenylsuccinic compound is polybutenylsuccinic anhydride and the metal salt is nickel alkyl ($C_{15}$–$C_{20}$) benzene sulfonate, wherein the polybutenyl is derived from polybutene having a molecular weight of 1350.
14. The product of claim 1 wherein the organic nitrogen compound is tetraethylenepentamine, the alkenylsuccinic compound is polybutenylsuccinic anhydride and the metal salt is zinc alkyl ($C_{15}$–$C_{20}$) benzene sulfonate, wherein said polybutenyl is derived from polybutene having a molecular weight of 1350.

References Cited
UNITED STATES PATENTS

| | | | |
|---|---|---|---|
| 3,284,354 | 11/1966 | Tunkel et al. | 252—32.7 |
| 3,346,493 | 10/1967 | Lesuer | 252—32.5 |
| 3,401,185 | 10/1968 | Meinhardt | 260—429.9 |

DELBERT E. GANTZ, Primary Examiner

A. P. DEMERS, Assistant Examiner

U.S. Cl. X.R.

44—63, 68, 72; 252—32.5, 33, 33.6, 42.7; 260—429 R, 429.9, 430, 431, 435 R, 438.1, 538.5 R, 439 R

UNITED STATES PATENT OFFICE
CERTIFICATE OF CORRECTION

Patent No. 3,649,661      Dated March 14, 1972

Inventor(s) FERDINAND P. OTTO and ANDREAS LOGOTHETIS

It is certified that error appears in the above-identified patent and that said Letters Patent are hereby corrected as shown below:

In column 2, line 38, "R-$\overset{\overset{O}{\|}}{P}$(X)-OX" should be --R-$\overset{\overset{O}{\|}}{P}$(X)-OH--.
In column 2, line 69, "porducts" should be --products--. In column 3, line 15, "tolylsulfonat" should be --tolylsulfonate--.
In column 3, line 17, "derivatvies" should be --derivatives--.
In column 3, line 20, "nitrgoen" should be -- nitrogen --. In column 3, line 37, "reactantsuitilizable" should be --reactants utilizable--. In column 3, line 69, "relation" should be --reaction--. In column 4, line 20, "meal" should be --metal--. In column 4, line 53, "from 4" should be --from about 4--. In column 10, line 14, "nonyphenyl" should be --nonylphenyl--.

Signed and sealed this 1st day of August 1972.

(SEAL)
Attest:

EDWARD M. FLETCHER, JR.      ROBERT GOTTSCHALK
Attesting Officer      Commissioner of Patents